United States Patent
Choi

(10) Patent No.: US 9,178,379 B2
(45) Date of Patent: Nov. 3, 2015

(54) CHARGER FOR ELECTRIC VEHICLE

(71) Applicant: LSIS CO., LTD., Anyang-si, Gyeonggi-do (KR)

(72) Inventor: Seung Woo Choi, Suwon-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 191 days.

(21) Appl. No.: 13/929,491

(22) Filed: Jun. 27, 2013

(65) Prior Publication Data

US 2014/0002022 A1    Jan. 2, 2014

(30) Foreign Application Priority Data

Jun. 29, 2012  (KR) ........................ 10-2012-0070639

(51) Int. Cl.
*H02J 7/00* (2006.01)
*H02J 7/02* (2006.01)
*B60L 11/18* (2006.01)

(52) U.S. Cl.
CPC ............. *H02J 7/027* (2013.01); *B60L 11/1816* (2013.01); *B60L 2230/12* (2013.01); *Y02T 10/7005* (2013.01); *Y02T 10/7088* (2013.01); *Y02T 90/121* (2013.01); *Y02T 90/14* (2013.01); *Y02T 90/16* (2013.01)

(58) Field of Classification Search
CPC ........................... B60L 11/1861; B60L 11/1816
USPC ........................................................ 320/109
See application file for complete search history.

(56) References Cited

U.S. PATENT DOCUMENTS

| | | | |
|---|---|---|---|
| 5,519,302 A | | 5/1996 | Mino et al. |
| 5,592,070 A | | 1/1997 | Mino |
| 5,596,261 A | * | 1/1997 | Suyama ........................ 320/152 |
| 5,650,710 A | * | 7/1997 | Hotta ............................ 320/128 |
| 5,686,812 A | * | 11/1997 | Hotta ............................ 320/134 |

(Continued)

FOREIGN PATENT DOCUMENTS

| | | |
|---|---|---|
| CN | 102195224 | 9/2011 |
| JP | 06-022466 | 1/1994 |

(Continued)

OTHER PUBLICATIONS

Japan Patent Office Application Serial No. 2013-136363, Office Action dated Dec. 8, 2014, 3 pages.

(Continued)

*Primary Examiner* — Suchin Parihar
(74) *Attorney, Agent, or Firm* — Lee, Hong, Degerman, Kang & Waimey

(57) ABSTRACT

Disclosed is a charger for an electric vehicle. The charger includes a connector connected to the electric vehicle, a plug connected to an outlet of the commercial power source, a switching unit to selectively shut off the current according to a temperature of the charger, a display unit to display information about an operation of the charger, and a control unit to control the operation of the charger, wherein the control unit controls the display unit to display two kinds of mutually different information when the current is shut off because the battery is fully charged or the connector is separated from the electric vehicle and when the current supplied from the commercial power source to the electric vehicle is shut off by the switching unit. The charger is prevented from being damaged due to overheat during the charging operation for the electric vehicle.

13 Claims, 3 Drawing Sheets

(56) References Cited

U.S. PATENT DOCUMENTS

| | | | |
|---|---|---|---|
| 6,087,805 A * | 7/2000 | Langston et al. | 320/109 |
| 6,771,046 B2 * | 8/2004 | Ariga et al. | 320/125 |
| 7,391,183 B2 * | 6/2008 | Ariga et al. | 320/125 |
| 8,183,819 B2 * | 5/2012 | Sugano | 320/103 |
| 2003/0169017 A1 * | 9/2003 | Ariga et al. | 320/125 |
| 2004/0232890 A1 * | 11/2004 | Ariga et al. | 320/150 |
| 2008/0094036 A1 * | 4/2008 | Yamashita et al. | 320/162 |
| 2009/0091291 A1 * | 4/2009 | Woody et al. | 320/109 |
| 2010/0201323 A1 * | 8/2010 | Okamura | 320/134 |
| 2011/0128007 A1 * | 6/2011 | Nishidai et al. | 324/427 |
| 2011/0227525 A1 * | 9/2011 | Blackall et al. | 320/107 |
| 2012/0049797 A1 * | 3/2012 | Tamaki et al. | 320/109 |
| 2013/0134933 A1 * | 5/2013 | Drew et al. | 320/109 |
| 2013/0193918 A1 * | 8/2013 | Sarkar et al. | 320/109 |
| 2013/0346025 A1 * | 12/2013 | Schulz | 702/182 |
| 2014/0347017 A1 * | 11/2014 | Sugano | 320/137 |
| 2015/0236523 A1 * | 8/2015 | Takano et al. | 320/108 |

FOREIGN PATENT DOCUMENTS

| | | |
|---|---|---|
| JP | 07-222370 | 8/1995 |
| JP | 11-308779 | 11/1999 |
| JP | 2007-181263 | 7/2007 |
| JP | 2011-172327 | 9/2011 |
| JP | 2012-044744 | 3/2012 |

OTHER PUBLICATIONS

Japan Patent Office Application Serial No. 2013-136363, Office Action dated May 19, 2014, 3 pages.

The State Intellectual Property Office of the People's Republic of China Application Serial No. 201310272070.8, Office Action dated Jan. 4, 2015, 9 pages.

\* cited by examiner

CHARGER FOR ELECTRIC VEHICLE

CROSS-REFERENCE TO RELATED APPLICATIONS

Pursuant to 35 U.S.C. §119(a), this application claims the benefit of earlier filing date and right of priority to Korean Patent Application No. 10-2012-0070639, filed on Jun. 29, 2012, the contents of which is incorporated by reference herein in its entirety.

BACKGROUND

The embodiment relates to a charger for an electric vehicle.

The electric vehicle refers to a vehicle driven by using electricity. The electric vehicle is mainly classified into a battery powered electric vehicle and a hybrid electric vehicle. The battery powered electric vehicle is driven by using only electricity, which is generally called an electric vehicle. In addition, the hybrid electric vehicle is driven by using both of the electricity and the fossil fuel. In addition, the electric vehicle is equipped with a battery to supply electricity for driving. In particular, the battery powered electric vehicle and a plug-in type hybrid electric vehicle have batteries charged with power supplied from an external power supply, and drive an electric motor by using the power charged in the battery.

Meanwhile, in the case of a cord-set type charger among chargers used to charge the electric vehicle, the commercial power is used to charge the electric vehicle. To this end, the cord-set type charger is connected to an outlet of a home or an office or the electric vehicle to supply power to the electric vehicle.

However, according to the related art, there is no technology to control the charge of a battery by taking the temperature of the cord-set type charger into consideration. Thus, according to the related art, the cord-set type charger may be overheated during the charging operation for the battery so that the charger may be damaged.

SUMMARY

The embodiment provides a charger for an electric vehicle, which can be prevented from being damaged by overheat.

According to the embodiment, there is provided a charger to supply current from a commercial power source to a battery of an electric vehicle. The charger includes a connector connected to the electric vehicle, a plug connected to an outlet of the commercial power source to supply the current for charging the battery of the electric vehicle, a switching unit to selectively shut off the current supplied from the commercial power source to the electric vehicle according to a temperature of the charger, a display unit to display information about an operation of the charger, and a control unit to control the operation of the charger, wherein the control unit controls the display unit to display two kinds of mutually different information when the current supplied from the commercial power source to the electric vehicle is shut off because the battery is fully charged or the connector is separated from the electric vehicle and when the current supplied from the commercial power source to the electric vehicle is shut off by the switching unit.

According to the embodiment, the power supplied from the cord-set charger to the electric vehicle may be selectively shut off according to the temperature. Thus, the charger can be prevented from being damaged due to overheat during the charging operation for the electric vehicle.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Hereinafter, the structure of a charger for an electric vehicle according to the first embodiment will be described with reference to accompanying drawings.

Figure 1:
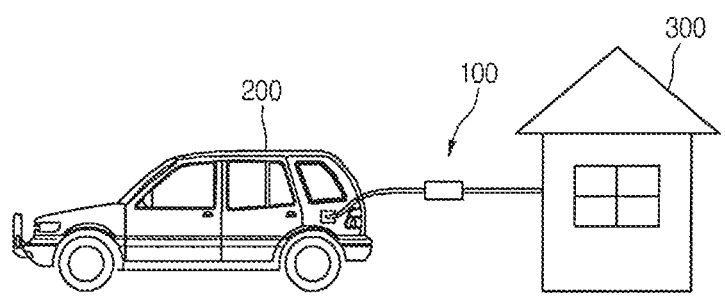
FIG. 1 is a schematic view showing that a charger for an electric vehicle according to the first embodiment is connected to charge the electric vehicle.
Figure 2:
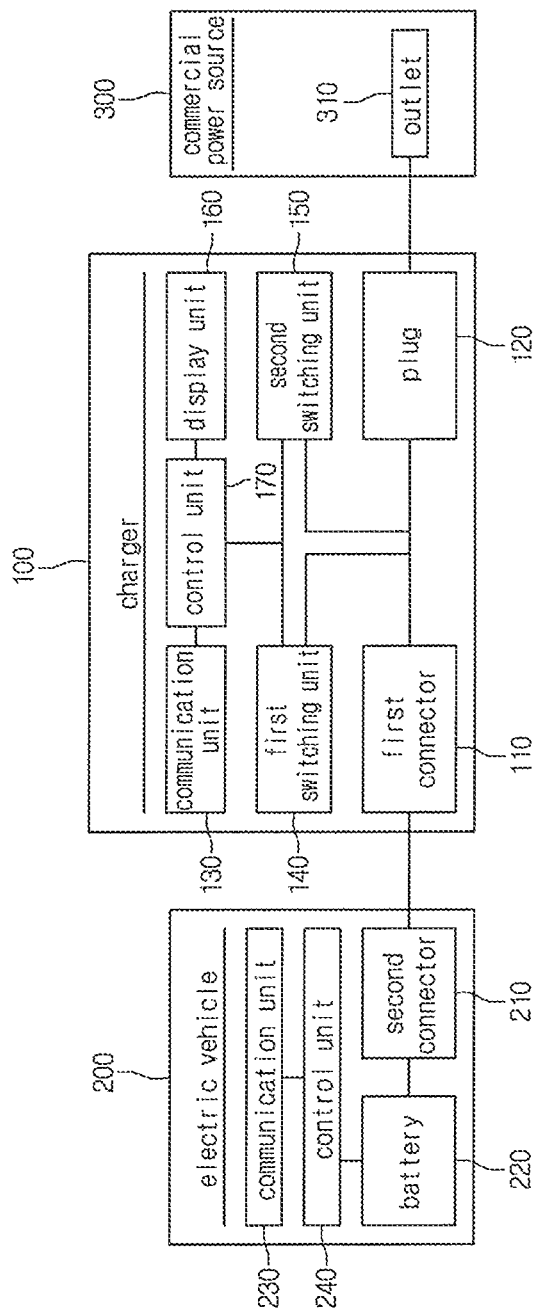
FIG. 2 is a block diagram showing a structure of a charger for an electric vehicle according to the first embodiment.

FIG. 1 is a schematic view showing that the charger for the electric vehicle according to the first embodiment is connected to charge the electric vehicle and FIG. 2 is a block diagram showing the structure of the charger for the electric vehicle according to the first embodiment.

Referring to FIGS. 1 and 2, the cord-set type charger (hereinafter, referred to as 'charger') 100 according to the embodiment is connected to the electric vehicle 200 or a commercial power source 300 of a home or an office to supply power to the electric vehicle 200. The charger 100 includes a first connector 110, a plug 120, a communication unit 130, first and second switching units 140 and 150, a display unit 160 and a control unit 170.

In detail, the connector 110 and the plug 120 are connected to a connector 210 provided in the electric vehicle 200 and an outlet 310 provided in the commercial power source 300, respectively. In the following description, the connector provided in the charger 100 will be referred to as the first connector 110 and the connector provided in the electric vehicle 200 will be referred to as the second connector 210 for the purpose of convenience. If the plug 120 and the first connector 110 are connected to the outlet 310 and the second connector 210, respectively, current supplied from the commercial power source 300 is transferred to the electric vehicle 200, actually, to a battery 220 through the charger 100.

The communication unit 130 can make communication with the electric vehicle 200, actually, with a communication unit 230 provided in the electric vehicle 200. For instance, the communication unit 130 can make communication with the communication unit 230 through the power line communication scheme. In addition, information, for instance, information about the start and completion of the charging operation for the battery 220 is transferred to the charger 100 from the electric vehicle 200 through the communication unit 130 and the communication unit 230.

The first and second switching units 140 and 150 selectively shut off the current supplied from the commercial power source 300 to the electric vehicle 200. According to the present embodiment, the first switching unit 140 is turned on or off by the control unit 170 to allow the current to be supplied from the commercial power source 300 to the electric vehicle 200 or shut off the current supplied from the commercial power source 300 to the electric vehicle 200. In addition, the second switching unit 150 is turned on or off according to the temperature to supply the current from the commercial power source 300 to the electric vehicle 200 or shut off the current supplied from the commercial power source 300 to the electric vehicle 200. For instance, if the temperature of the charger 100 is less than the safety temperature, the second switching unit 150 is turned on to supply the current from the commercial power source 300 to the electric vehicle 200. In addition, if the temperature of the charger 100 is equal to or higher than the safety temperature, the second switching unit 150 is turned off to shut off the current supplied from the commercial power source 300 to the electric vehicle 200. At this time, the second switching unit 150 may be thermally deformed according to the temperature of the charger 100 to supply the current from the commercial power source 300 to the electric vehicle 200 or shut off the current supplied from the commercial power source 300 to the electric vehicle 200. For instance, the second switching unit 150 may include a bimetal which is thermally deformed and bent at the safety temperature. The safety temperature may be set in the range of 70° C. to 90° C. For instance, the safety temperature may be set to 80° C.

The display unit 160 displays information about the operation of the charger 100, that is, the charging operation of the charger 100. For instance, the display unit 160 may include a plurality of light emitting members, such as light emitting diodes, to emit lights having mutually different colors according to the charging operation. For instance, the display unit 160 may generate the light having the green color during the charging operation. In addition, the display unit 160 may generate the light having the yellow color when the charging operation is completed and may generate the light having the red color when the charging operation is stopped. The expression 'completion of the charging operation' refers to the case where the battery 220 is fully charged or the case where the current supply from the commercial power source 300 to the electric vehicle 200 is completed as the first connector 110 is separated from the second connector 210. The expression 'stop of the charging operation' refers to the case where the current supply from the commercial power source 300 to the electric vehicle 200 is shut off because the second switching unit 150 is turned off. Actually, the 'completion of the charging operation' may signify the case where the current supply from the commercial power source 300 to the electric vehicle 200 is shut off except for the 'stop of the charging operation'.

Meanwhile, the control unit 170 controls the operation of the charger 100. For instance, the control unit 170 controls information transmitted from the electric vehicle 200 to the charger 100 through the communication unit 130 and the communication unit 230 or controls the operation of at least one of the first switching unit 140 and the display unit 160 according to the operation of the second switching unit 150.

That is, the control unit 170 controls the operation of the display unit 160 to display the state of the charging operation when information representing the start of the charging operation for the battery 220 is transmitted from the electric vehicle 200 to the charger 100 through the communication unit 130 and the communication unit 230. In addition, the control unit 170 controls the operations of the first switching unit 140 and the display unit 160 to shut off the current supplied from the commercial power source 300 to the electric vehicle 200 and to display the completion of the charging operation when information representing the completion of the charging operation for the battery 220 is transmitted from the electric vehicle 200 to the charger 100 through the communication unit 130 and the communication unit 230. According to the present embodiment, the control unit 170 controls the operation of the display unit 160 to display the stop of the charging operation when the current supply from the commercial power source 300 to the electric vehicle 200 is shut off due to the turn-off of the second switching unit 150.

In addition, the electric vehicle 200 may include a control unit 240. The control unit 240 may control the charging operation of the battery 220. In particular, according to the present embodiment, the control unit 240 may control the charging operation such that information about the charging state of the battery 220 can be transmitted to the charger 100 through the communication unit 230.

According to the present embodiment having the above structure, when the plug 120 and the first connector 110 are connected to the outlet 310 and the second connector 210, respectively, the current is supplied from the commercial power source 300 to the electric vehicle 200 through the charger 100. At this time, the second switching unit 150 allows the current to be supplied from the commercial power source 300 to the electric vehicle 200 or shuts off the current supplied from the commercial power source 300 to the electric vehicle 200 according to the temperature of the charger 100. In detail, if the temperature of the charger 100 is less than the safety temperature, the second switching unit 150 is turned on so that the current is supplied from the commercial power source 300 to the electric vehicle 200. Thus, the battery 220 may be charged with the current supplied from the commercial power source 300. However, if the temperature of the charger 100 is equal to or higher than the safety temperature, the second switching unit 150 is turned off so that the current supplied from the commercial power source 300 to the electric vehicle 200 is shut off. Therefore, the charger 100 can be prevented from being damaged due to overheat during the charging operation of the electric vehicle 200.

In addition, according to the present embodiment, the display unit 160 displays information about the operation of the charger 100, such as the state of the charging operation, completion of the charging operation and stop of the charging operation. In particular, the display unit 160 displays information such that the user can discriminately recognize the completion of the charging operation for the battery 220, completion of the charging operation such as disconnection of the first and second connectors 110 and 210, and the stop of the charging operation caused by the turn-off of the second switching unit 150. Thus, according to the present embodiment, the user can more readily recognize overheat of the charger 100 and can take necessary steps.

Hereinafter, a charger for an electric vehicle according to the second embodiment will be described with reference to accompanying drawings.

Figure 3:
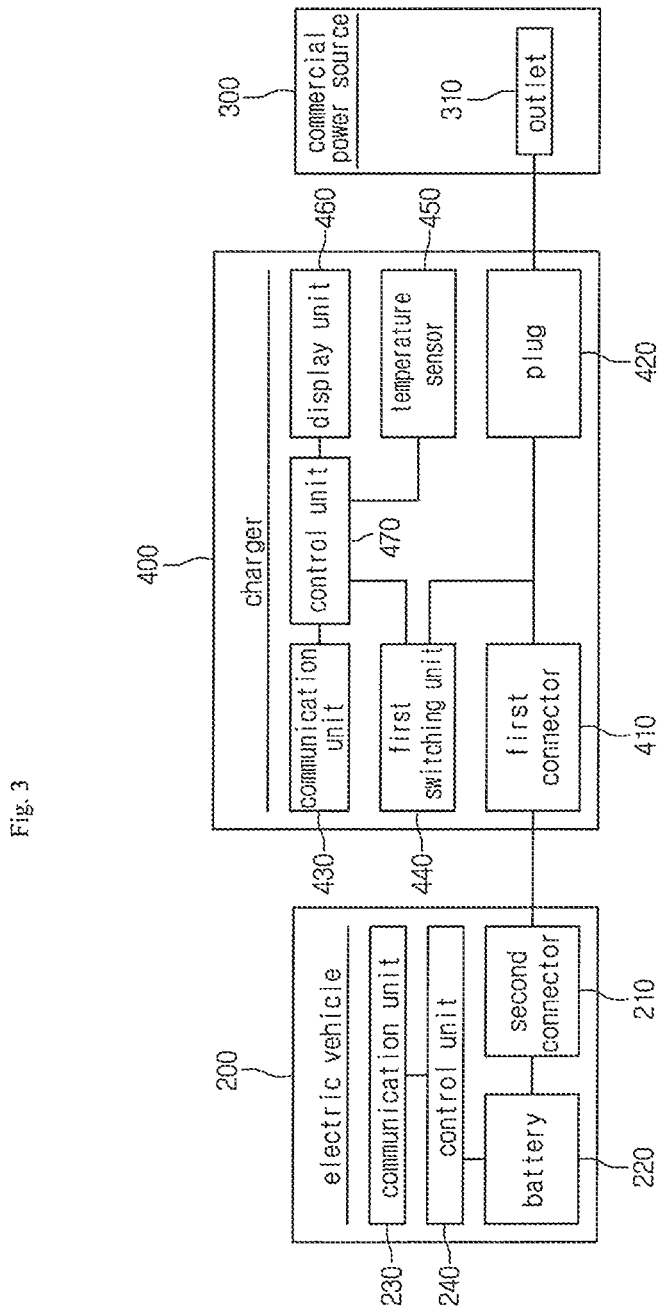
FIG. 3 is a block diagram showing a structure of a charger for an electric vehicle according to the second embodiment.

FIG. 3 is a block diagram showing the structure of the charger for the electric vehicle according to the second embodiment.

Referring to FIG. 3, the charger 400 according to the second embodiment includes a first connector 410, a plug 420, a communication unit 430, a first switching unit 440, a temperature sensor 450, a display unit 460 and a control unit 470. The structure of the first connector 410, the plug 420 and the communication unit 430 is identical to the structure of the first connector 110, the plug 120 and the communication unit 130 according to the first embodiment, so detailed description thereof will be omitted.

The temperature sensor 450 senses the temperature of the charger 400. Various types of temperature sensors generally known in the art can be used as the temperature sensor 450.

The display unit 460 displays information about the operation of the charger 400. For instance, the display unit 460 may generate lights having mutually different colors according to the information about the operation of the charger 400, such as the state of the charging operation, completion of the charging operation and stop of the charging operation. In particular, according to the present embodiment, the display unit 460 displays mutually different information according to the intensity of current supplied to the electric vehicle 200 through the charger 400 during the charging operation. For instance, as will be described later, if the intensity of current supplied to the electric vehicle 200 through the charger 400 is reduced, the display unit 460 may reduce the number of light emitting diodes to be turned on to generate the light having the green color.

In addition, the control unit 470 controls the operation of the charger 400. For instance, the control unit 470 controls the operation of the first switching unit 440 and the display unit 460 according to information transmitted from the electric vehicle 200 to the charger 400 through the communication unit 430 and the communication unit 230 or according to the temperature value sensed by the temperature sensor 450.

In detail, the control unit 470 controls the operation of the display unit 460 to display the state of the charging operation when information representing the start of the charging operation for the battery 220 is transmitted from the electric vehicle 200 to the charger 400 through the communication unit 430 and the communication unit 230. In addition, the control unit 470 controls the operations of the first switching unit 440 and the display unit 460 to shut off the current supplied from the commercial power source 300 to the electric vehicle 200 and to display the completion of the charging operation when information representing the completion of the charging operation for the battery 220 is transmitted from the electric vehicle 200 to the charger 400 through the communication unit 430 and the communication unit 230.

According to the present embodiment, the control unit 470 controls the operation of the first switching unit 440 to adjust the intensity of current supplied from the commercial power source 300 to the electric vehicle 200 according to the temperature value of the charger 400 sensed by the temperature sensor 450 during the charging operation or to allow the current to be supplied from the commercial power source 300 to the electric vehicle 200 or to shut off the current supplied from the commercial power source 300 to the electric vehicle 200. For instance, if the temperature value of the charger 400 sensed by the temperature sensor 450 is less than a predetermined first safety temperature, the control unit 470 controls the first switching unit 440 to supply a predetermined first current from the commercial power source 300 to the electric vehicle 200. In addition, if the temperature value of the charger 400 sensed by the temperature sensor 450 is equal to or higher than the predetermined first safety temperature and less than a predetermined second safety temperature, the control unit 470 controls the first switching unit 440 to supply a predetermined second current from the commercial power source 300 to the electric vehicle 200. Further, if the temperature value of the charger 400 sensed by the temperature sensor 450 is higher than the predetermined second safety temperature, the control unit 470 shuts off the current supplied from the commercial power source 300 to the electric vehicle 200. The first and second safety temperatures are set by taking safety of the charger 400 into consideration. The first safety temperature may be in the range of 50° C. to 80° C. For instance, the first safety temperature may be set to 70° C. In addition, the second safety temperature may be in the range of 70° C. to 90° C. For instance, the second safety temperature may be set to 80° C. The first safety temperature may be lower than the second safety temperature. Therefore, actually, the second temperature may be equal to the safety temperature of the first embodiment described above. In addition, the first current is a substantially maximum current to be supplied to the electric vehicle 200 through the charger 400. In addition, the second current is set to have a value to minimize the temperature increase of the charger 400 by taking the first and second safety temperatures into consideration. The value of the second current is smaller than the value of the first current. In addition, the second current may have no specific value and may be set to have a value which is reduced from the value of the first current inversely proportional to the temperature value of the charger 400 sensed by the temperature sensor 450.

For instance, if the temperature value of the charger 400 sensed by the temperature sensor 450 is less than the first safety temperature, the control unit 470 may control the operation of the first switching unit 440 to supply the current of the commercial power source 300 to the electric vehicle 200. In addition, if the temperature value of the charger 400 sensed by the temperature sensor 450 is equal to or higher than the first safety temperature and less than the second safety temperature, the control unit 470 may control the operation of the first switching unit 440 to supply the current of the commercial power source 300 to the electric vehicle 200 via a separate resistor. Further, if the temperature value of the charger 400 sensed by the temperature sensor 450 is equal to or higher than the second safety temperature, the control unit 470 may control the operation of the first switching unit 440 to shut off the current supplied from the commercial power source 300 to the electric vehicle 200.

Meanwhile, if the temperature value of the charger 400 sensed by the temperature sensor 450 is less than the first safety temperature, or equal to or higher than the first safety temperature and less than the second safety temperature, that is, when the first current is supplied from the commercial power source 300 to the electric vehicle 200 and when the second current is supplied from the commercial power source 300 to the electric vehicle 200 during the charging operation, the control unit 470 may control the operation of the display unit 460 to display mutually different information. Further, if the temperature value of the charger 400 sensed by the temperature sensor 450 is higher than the second safety temperature, that is, when the charging operation is stopped, the control unit 470 controls the display unit 460 to display the stop state of the charging operation.

As described above, according to the embodiment, the intensity of the current supplied from the commercial power source 300 to the electric vehicle 200 is reduced or shut off according to the temperature of the charger 400. Therefore, according to the embodiment, the charger 400 may have superior safety and operating reliability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charger to supply current from a commercial power source to a battery of an electric vehicle, the charger comprising:
   a connector connected to the electric vehicle;
   a plug connected to an outlet of the commercial power source to supply the current for charging the battery of the electric vehicle;
   a switching unit to selectively shut off the current supplied from the commercial power source to the electric vehicle according to a temperature of the charger, wherein the switching unit including a first switching unit which is turned on or off when a charging operation for the battery is started or completed, and a second switching unit which is turned on when the temperature of the charger is less than a predetermined safety temperature and turned off when the temperature of the charger is equal to or higher than the predetermine safety temperature;
   a display unit to display information about an operation of the charger; and
   a control unit to control the operation of the charger,
   wherein the control unit turns off the first switching unit when information about completion of the charging operation for the battery is transmitted thereto from the electric vehicle.

2. The charger of claim 1, wherein the second switching unit is thermally deformed according to the temperature of the charger.

3. The charger of claim 1, wherein the control unit controls the display unit to display two kinds of mutually different information when the first switching unit is turned off and when the second switching unit is turned off.

4. The charger of claim 1, further comprising a communication unit that receives information about a start and the completion of the charging operation for the battery from the electric vehicle.

5. A charger to supply current from a commercial power source to a battery of an electric vehicle, the charger comprising:
   a connector connected to the electric vehicle;
   a plug connected to an outlet of the commercial power source to supply the current for charging the battery of the electric vehicle;
   a temperature sensor to sense a temperature of the charger;
   a first switching unit to selectively shut off the current supplied from the commercial power source to the electric vehicle and to adjust intensity of the current supplied from the commercial power source to the electric vehicle;
   a control unit to control an operation of the charger; and
   a display unit to display information about the operation of the charger,
   wherein the control unit controls the first switching unit to allow a predetermined first current to be applied from the commercial power source to the electric vehicle when the temperature of the charger sensed by the temperature sensor is less than a predetermined first safety temperature and controls the first switching unit to allow a predetermined second current to be applied from the commercial power source to the electric vehicle when the temperature of the charger sensed by the temperature sensor is equal to or higher than the predetermined first safety temperature and less than a predetermined second safety temperature, and
   the display unit displays two kinds of mutually different information when the current is supplied from the commercial power source to the electric vehicle and when the current supplied from the commercial power source to the electric vehicle is shut off.

6. The charger of claim 5, wherein a current value of the second current is smaller than a current value of the first current.

7. The charger of claim 6, wherein the current value of the second current is inversely proportional to the temperature of the charger sensed by the temperature sensor.

8. The charger of claim 5, wherein the control unit controls the first switching unit to shut off the current supplied from the commercial power source to the electric vehicle when the temperature of the charger sensed by the temperature sensor is equal to or higher than the second safety temperature.

9. The charger of claim 5, wherein the control unit controls the first switching unit to shut off the current supplied from the commercial power source to the electric vehicle when the battery is fully charged or the connector is separated from the electric vehicle.

10. The charger of claim 5, wherein the controller controls the display unit to emit a light having a predetermined color when the temperature of the charger is less than the predetermined first safety temperature and controls the display unit to emit a light having a color different from a color reproduced as the first current is applied when the temperature of the charger is equal to or higher than the predetermined first safety temperature and less than the predetermined second safety temperature.

11. The charger of claim 5, wherein the controller controls the first switching unit to allow the current of the commercial power source to be supplied to the electric vehicle via a separate resistor when the temperature of the charger is equal to or higher than the predetermined first safety temperature and less than the predetermined second safety temperature.

12. The charger of claim 5, wherein the display unit comprises a plurality of light emitting members that display mutually different information according to a charging operation.

13. The charger of claim 12, wherein the light emitting members emit lights having mutually different colors or a number of the light emitting members to be turned on is changed according to the charging operation.

* * * * *